United States Patent
Josephson, II et al.

(10) Patent No.: US 7,167,842 B1
(45) Date of Patent: Jan. 23, 2007

(54) ARCHITECTURE AND METHOD FOR OPERATIONAL PRIVACY IN BUSINESS SERVICES

(75) Inventors: Robert N. Josephson, II, Richmond, VA (US); Vernon Keith Boland, Lexington, SC (US)

(73) Assignee: NCR Corp., Dayton, OH (US)

(*) Notice: Subject to any disclaimer, the term of this patent is extended or adjusted under 35 U.S.C. 154(b) by 441 days.

(21) Appl. No.: 09/604,825

(22) Filed: Jun. 27, 2000

(51) Int. Cl.
*G06Q 99/00* (2006.01)
*H04K 1/00* (2006.01)
*H04L 9/00* (2006.01)

(52) U.S. Cl. .................. 705/64; 705/63; 705/76; 705/44; 707/1; 707/9; 707/10

(58) Field of Classification Search .......... 705/63–64, 705/76, 44, 67; 707/9, 10, 1
See application file for complete search history.

(56) References Cited

U.S. PATENT DOCUMENTS

| | | |
|---|---|---|
| 4,951,968 A | 8/1990 | Adams |
| 5,260,986 A | 11/1993 | Pershan |
| 5,326,959 A | 7/1994 | Perazza |
| 5,465,206 A | 11/1995 | Hilt et al. |
| 5,699,528 A | 12/1997 | Hogan |
| 5,832,460 A | 11/1998 | Bednar et al. |
| 5,861,797 A | 1/1999 | Becker |
| 5,920,847 A | 7/1999 | Kolling et al. |
| 6,240,416 B1* | 5/2001 | Immon et al. ............... 707/10 |
| 6,275,824 B1* | 8/2001 | O'Flaherty et al. ............ 707/9 |
| 6,298,348 B1* | 10/2001 | Eldering ..................... 707/10 |
| 6,438,544 B1* | 8/2002 | Grimmer et al. .............. 707/5 |
| 2002/0004816 A1* | 1/2002 | Vange et al. ................ 709/202 |
| 2002/0035556 A1* | 3/2002 | Shah et al. .................... 707/1 |
| 2002/0169866 A1* | 11/2002 | Lim et al. .................. 709/223 |
| 2002/0188584 A1* | 12/2002 | Ghannam et al. .............. 707/1 |

* cited by examiner

*Primary Examiner*—Kambiz Abdi
(74) *Attorney, Agent, or Firm*—Maginot, Moore & Beck

(57) ABSTRACT

Consent-based application programming interfaces (APIs) are used to provide privacy access controls to operational systems for business services accomplished particularly in an electronic and/or networked environment. An API implementation device or host provides a link between a channel application, configured to provide an interface with a customer, and privacy data as used by operational applications and obtained from databases such as data warehouses. The privacy APIs provide per-customer choice/consent to obtaining and/or retrieval of privacy information/data and per-customer access thereto. In one form, the privacy APIs are used in business initiated self service applications wherein an activity or event triggers business to customer initiation.

10 Claims, 3 Drawing Sheets

ARCHITECTURE AND METHOD FOR OPERATIONAL PRIVACY IN BUSINESS SERVICES

FIELD OF THE INVENTION

The present invention relates to business services and, more particularly, to a method of permitting operational privacy in business services.

DESCRIPTION OF THE PRIOR ART

In the marketplace of today, customers generally initiate self-service functions with businesses. Such customer to business initiation may take the form of a customer visiting a business web site, initiating a telephone call to the business, visiting the physical store of the business, visiting/using an ATM, visiting/using a kiosk or retail terminal, and the like. Businesses, however, typically do not initiate contact with customers other than via mailings such as brochures and catalogs, or when there is a problem that needs to be resolved.

When a business furnishes a means for self-service, such as a point-of-service (POS) retail terminal or kiosk, it is important to assure that the self-service experience is provided in the most personalized manner as possible. One way to provide this personalization in a self-service environment is to have or obtain a consumer's preferences and use/adhere to these preferences during the self-service session. These preferences, however, should adhere to legal privacy rights of the customer and/or the legal privacy policies of the business. In addition to the legal privacy concerns mentioned above, it is prudent to provide assurance to the consumer that the data collected will be obtained, retained and disseminated in accordance with ethical privacy concerns.

Since the current trend in business is toward obtaining more information/data regarding the consumer with the intent of providing better service based on the information/data, the consumer should be completely aware of such information/data mining. In addition to being aware that information/data is being collected, the consumer should be allowed choices as to what information/data will be collected. When such information/data is being collected, it should be accomplished privately.

As well, certain consumer information/data is preexisting in databases such as data warehouses. It is sometimes necessary for an application to access and/or retrieve some of this information/data. At times, it may not be necessary to retrieve all of the consumer information, nor is it necessary to allow the viewing of the information.

Currently, there is no framework for providing consumer privacy during electronic business transactions with regard to collecting and/or retrieving consumer information/data. Consumer information/data that exists in data warehouses and the like typically are freely accessible without regard to the application or context in which it is used.

It is thus desirable to provide a framework for operational privacy in electronic consumer/business applications.

It is also thus desirable to provide operational privacy in business initiated services when obtaining and/or retrieving consumer information/data.

It is further desirable to provide personalization of a self-service business session and provide operational privacy for consumer information/data.

It is even further desirable to provide a means for customer specified consent to data collection/retrieval in an electronic business setting.

It is still further desirable to provide a business model for obtaining personal information/data from a customer during a customer/business session.

It is further desirable to provide a business model for retrieving personal information/data from a customer during a customer/business session.

It is also further desirable to provide a business model for obtaining personal data from a customer during a customer/business session and to permit a customer to specify use permissions for the collected data.

SUMMARY OF THE INVENTION

The present invention is a method for addressing operational privacy in business services. The present invention is particularly suited for self service customer-to-business applications and, more particularly, to business initiated business-to-customer applications. The present invention, however, is not limited to these applications, but are applicable to all types of electronic applications.

In one form, there is provided an architecture for obtaining consumer privacy data via a network. The architecture includes a host device in communication with the network and containing a first API and a second API, wherein the first API is adapted to interface with a channel application functioning on a presentation device in communication with the network to request privacy data parameters from a consumer, and the second API is adapted to interface with an operational application functioning on the network to retrieve privacy data relating to the consumer according to said privacy data parameters. Further included is a privacy access and change log in communication with the host device and adapted to retain the consumer privacy data parameters.

In another form, the present invention is a method of providing operational privacy in a network environment. The method comprises the steps of: a) hosting a first API on a networked device wherein the first API is adapted to interface with a channel application operating on a networked presentation device to request privacy data parameters from a consumer; b) hosting a second API on the networked device wherein the second API is adapted to interface with an operational application operating on the networked presentation device to retrieve privacy data relating to the consumer according to the privacy data parameters; and c) logging the privacy data parameters on the networked device.

In yet another form, the present invention is an architecture for providing privacy of consumer data during a business transaction in an electronic network having a host computer in communication with the network. The architecture also includes a plurality of APIs resident on the host computer, wherein one of the APIs is adapted to interface with a channel application operating on a presentation device that is in communication with the network to request access to various consumer privacy data during the business transaction, another one of the APIs is adapted to interface with the channel application operating on the presentation device to request consumer consent to various privacy data categories during the business transaction, and a further one of the APIs is adapted to interface with an operational application operating on the network to obtain the consumer privacy data consistent with the access to the various consumer privacy data and the consent to various privacy data categories during the business transaction. The architecture further includes a consumer privacy access and consent log in communication with the network and adapted to retain consumer consents to various privacy data categories.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates a preferred embodiment of the invention, in one form, and such exemplification is not to be construed as limiting the scope of the invention in any manner.

DETAILED DESCRIPTION

Figure 1:
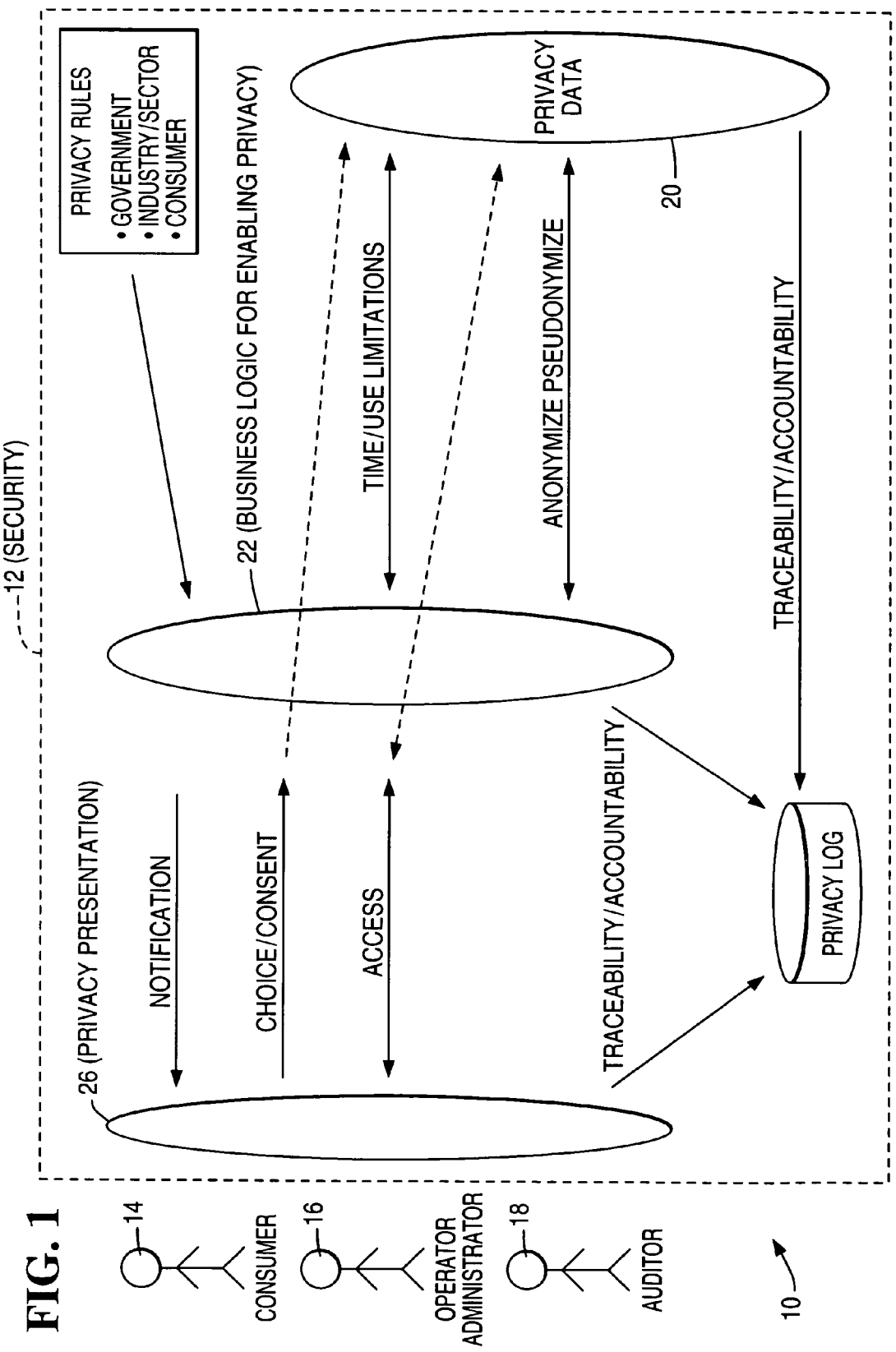
FIG. 1 depicts a diagram of an architecture model for enabling consumer privacy.

With reference to FIG. 1, there is shown a block diagram of a model architecture or framework generally designated 10 for enabling consumer privacy in electronic business applications. The model framework 10 assumes that a security area 12 (virtual or otherwise) surrounds or encompasses the various components of a business system and various privacy attributes associated therewith. The security area 12 depicted in FIG. 1 represents a boundary or zone of security since no physical "security" component or device in and of itself corresponds to the security area 12.

Within the security area 12 is consumer privacy data 20 that is typically stored in a database such as a data warehouse. To provide general privacy in accessing the privacy data 20, a business will have some type of business logic for enabling privacy 22 with regard to the privacy data 20. The business logic for enabling privacy 22 includes privacy rules for the government sector, the industry sector, and the consumer sector. These privacy rules encompass consumer to business transactions and business to consumer transactions, both typically with regard to all types of electronic applications.

The business logic 22 interacts/interfaces with the privacy data 20. There should be time and/or use limitations on the business regarding the privacy data 20. The time and use limitations may be prescribed by the business, the consumer, or the government, typically depending on the type of privacy data and the level of access required by the application. This applies to both the collection and retrieval of the privacy data 20. As well, it may be necessary to access the privacy data 20 anonymously or pseudonymously again, depending on the application and/or setting.

Additionally, the business logic for enabling privacy 22 preferably interacts/interfaces with a privacy presentation 26. The privacy presentation 26 may be implemented on a retail terminal, ATM, kiosk, home or business based computer, web-enabled device or the like (collectively "presentation device"), and includes audio and video necessary to implement the particular business function being utilized at the presentation device by a user. The user may be a consumer 14, an operator/administrator 16, an auditor 18 or the like (collectively "consumer"). The privacy presentation 26 may take different forms depending on the user.

The business logic for enabling privacy 22 should also provide a level of notification to the privacy presentation 26 (i.e. to a consumer 14 or other via the presentation device 26) that it will be necessary to collect/obtain and/or retrieve various data either directly from the consumer 14 or from the privacy data 20 (i.e. data warehouse) that has been previously collected/compiled. The privacy presentation 26 should also support a choice/consent mode for the consumer 14 to allow the collection or retrieval of privacy data for the particular transaction. This choice/consent may include levels of choice/consent depending on the particular transaction. After notification and choice/consent, the business logic 22 and the privacy presentation 26 should also provide access to the particular data based on the choice/consent parameters.

The security aspect 12 of the business privacy model should also include a privacy log 24 that includes a database of access and/or user activities with regard to each of the three privacy aspects, namely the privacy data 20, the business logic 22, and the privacy presentation 26. It is also preferable to assure traceability and/or accountability for access to, retrieval of and/or other use of the system via the presentation device. Therefore, the privacy data 20, the business logic 22, and the privacy presentation 26 all provide traceability and/or accountability data to the privacy log 24. The privacy log 24 is thus one-way relative to the business privacy model 10 in the sense that none of the areas obtain data from the privacy log 24 for normal operation. Of course, it is necessary to have access to the privacy log 24 in certain circumstances, but this is typically outside of the business privacy model 12.

It should be appreciated that the above business privacy model 12 may be utilized in various business applications and, particularly in electronic business applications. An exemplary business application is one in which a business initiates contact (e.g. self service) with a consumer. In this business model, a business event such as a bill becoming due or past due, triggers an action by the business to initiate contact with the consumer whose bill is due. Knowing the consumer's preferred channel of interaction (e.g. e-mail or telephone) the business initiates contact with the consumer on the consumer-preferred channel or mode of interaction. During the transaction, the business may obtain previously stored privacy data or obtain privacy data from the consumer based on notification to the consumer and subsequent choice and/or consent of the consumer.

Figure 2:
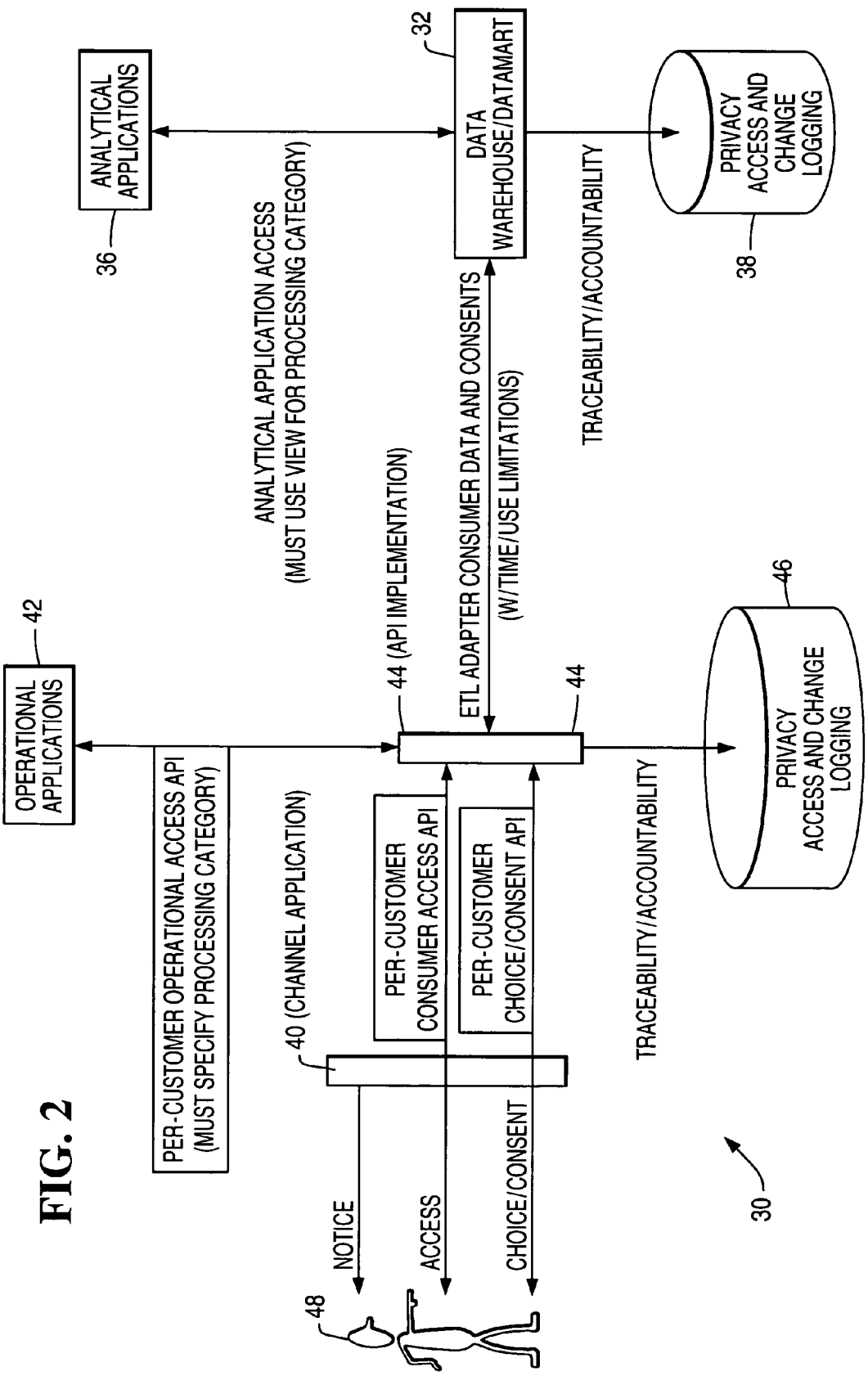
FIG. 2 depicts a diagram of CIS foundation privacy components.

With reference now to FIG. 2, there is shown a block diagram of a customer interaction system (CIS) architecture or model 30 in accordance with the principles of the present invention linked to a data warehouse or data mart 32 and its associated components. It should initially be understood that it is the role of the data warehouse 32 to provide view-level access to consumer data categories, where the view chosen by the analytical application 36 desiring to access the data matches the type of processing it will be doing with the data. In other words, the providing of consent-based views is appropriate for the data warehouse 32 since it is analyzing the data of many customers to obtain propensity scores, market segmentations, etc. In the analytical accessing of information/data from the data warehouse 32 it is generally preferable to provide privacy access and change logging 38. This may be implemented in a manner known in the art.

In contrast to the role of the data warehouse 32, it is the role of the CIS 30 to provide per-customer access to consumer data categories within both operational systems and channel applications. In accordance with an aspect of the present invention, privacy application programming interfaces (APIs) are provided that allow per customer choice/consent and/or per customer access to the CIS 30 and thus the consumer information/data wherever stored.

In the CIS 30, a channel application 40 provides an interface with a customer 48. The channel application 40 may be implemented on any electronic presentation device and encompasses a presentation device specific channel application and a general channel application applicable to various presentation devices. The channel application 40 is adapted/configured to provide notice to the customer 48 that information/data will be obtained or acquired from the individual and/or retrieved from the data warehouse 32 (or any other data source) as necessary. Such notice may take various forms as are known in the art.

Since the goal is to provide operational privacy in obtaining/retrieving personal data, access to such personal data is controlled/gained through the channel application 40 via a per-customer, consumer access API. The per-customer, consumer access API may be programmed in any manner as is known in the art. Additionally, the consumer is provided with the ability to choose and/or consent to the type of information/data obtained/retrieved via a per-customer choice/consent API. The per-customer choice/consent API may be programmed in any manner as is known in the art. As well, there is provided a per-customer operational access API for specifying a processing category to be used by an operational application.

In the following, the various privacy attributes discussed above with respect to FIG. 1 will now be described with respect to FIG. 2. One such privacy attribute is notice. Businesses should provide notice to their customers that personal data will be collected and how the collected data will be used and/or disclosed. Notification should include identities of the data collector and other intended recipients of the data as well as information about the "logic involved in automated processing." It is the strategy of the CIS architecture 30 for notice to be served by the channel application 40 such as a web server or call center application.

Another privacy attribute is choice/consent. Businesses should provide their customers with suitable choices to opt in or opt out of specific personal data items for collection, use and/or disclosure, consistent with the jurisdiction and the industry environment requirements in which they do business. The CIS 30 includes an API implementor 44 that hosts the consumer access API and the choice/consent API and forwards them to the channel application 40. This implies that the CIS 30 is acting as a dependent data mart to the privacy-enabled data warehouse 32, and has extracted the consumer access view of the warehouse 32 into the CIS 30 data model. In addition, any consent changes are logged into a logging system 46 of the CIS 30 and can be reviewed by the customer via the channel-application 40 for consistency before synchronizing them with the data warehouse 32 and its logging system 38.

In addition to providing consumer access to privacy data, the CIS 30 also provides operational applications/systems 42 with access to consumer data from the data warehouse 32. These accesses are provided on a per-customer basis. For example, a call center application may wish to access a particular customer's preferred agent, or an ATM application may wish to access a customer's favorite withdrawal amount. In order to provide this information in a way that is consistent with the customer's consent options on how the data may be processed, it is the strategy of the CIS 30 to provide APIs that allow operational applications/systems 42 to specify the types of processing that will be performed on the data. If the particular consumer's consent options are not consistent with the requested processing purpose, then the API will return either an access permission error or a "permission denied" string in place of the requested data. In addition, the present APIs are able to log accesses and modifications thereto to the log 46 and/or log 38 to fulfill the traceability/accountability requirements.

Another privacy attribute is access. Businesses should provide their customers with a method of ensuring that the personal data collected is accurate and up to date. This is accomplished by allowing customers to review and correct inaccurate or incomplete personal data. Additionally, the customer is allowed to erase or block access to data not collected in accordance with established rules (i.e. local legislation or the like). The present invention supports this feature by having the consumer access APIs within the CIS 30 system. These APIs allow the consumer to review both the data and the processing consent options associated with the data categories. Any changes are logged locally to a CIS change log 46 where the changes can be reviewed before synchronizing the changes with the data warehouse 32 via an ETL (Extract, Transform, and Load) adapter.

A further privacy attribute is security. Businesses should provide their customers with the assurance that the personal data they collect, use, and/or disclose is secure against loss and against unauthorized access, destruction, alteration, use of disclosure. It is the strategy of the CIS 30 for the channel applications 40 and operational applications/systems 42 to provide their own authentication services to prevent unauthorized access to the various APIs of the CIS 30. It is the responsibility of the CIS 30 to ensure that the appropriate database and/or operating system security mechanisms are implemented to provide the right level of access to authenticated users. The CIS 30 may require additional data views and/or security mechanisms to address particular customer requirements such as restricted administrator views and/or data protection agent views.

Yet another privacy attribute is limitation. Businesses should provide assurance to their customers that collection and use of personal data will be limited to explicit, specified, and legitimate purposes, and that the data will be kept in identifiable form for no longer than necessary to accomplish original purposes. It is the strategy for the CIS 30 that the data warehouse 32 (either directly associated with the CIS 30 or at another location and thus indirectly associated with the CIS 30) has the authoritative view of data limitations. When the data warehouse 32 determines that data should be erased or anonymized, the changes should be synchronized with the CIS 30 data store 46 via the ETL adapter as depicted in FIG. 2.

Still another privacy attribute is accountability. Businesses should be able to establish procedures for their customers to seek resolution or redress for possible violations of stated privacy principles and practices. Accountability includes support for enforcement of existing legal and regulatory remedies (country-specific) and notification to privacy authorities in each country of intent to collect personal data relating to their subjects. There are no specific technology features related to this principle in the CIS 30 but are addressable within the CIS environment.

An even further privacy attribute is traceability. Businesses should be able to provide assurance to regulators that all interactions and processing will be traceable and logged in such a way as to allow for internal assessments, as well as assessments by third parties, that demonstrate the business' compliance with privacy policies. It is the strategy of the CIS 30 to meet this requirement through the logging facilities 46 of both the per-customer personal data access of the CIS 30 and the view-level personal data access of the data warehouse.

Another privacy attribute is anonymity/pseudonymity. Businesses should be able to provide assurances to their customers that personal data can be maintained in a state of either anonymity or pseudonymity, as elected by the individual, such that the data cannot be used later to target the individual. It is the strategy of the CIS 30 for this feature to be provided solely by the data warehouse 32. Since the CIS 30 foundation provides per-customer APIs to access specific customer data, there is no notion of an anonymous (unidentified) customer having specific data.

It should be understood that the API implementation/implementor 44 is hosted by or retained on a computer, web site, or the like, that is networked to the various presentation devices used by the business for interfacing with the customer 48 or directly by the customer 48. The various applications may be hosted by the computer or by another networked device.

Figure 3:
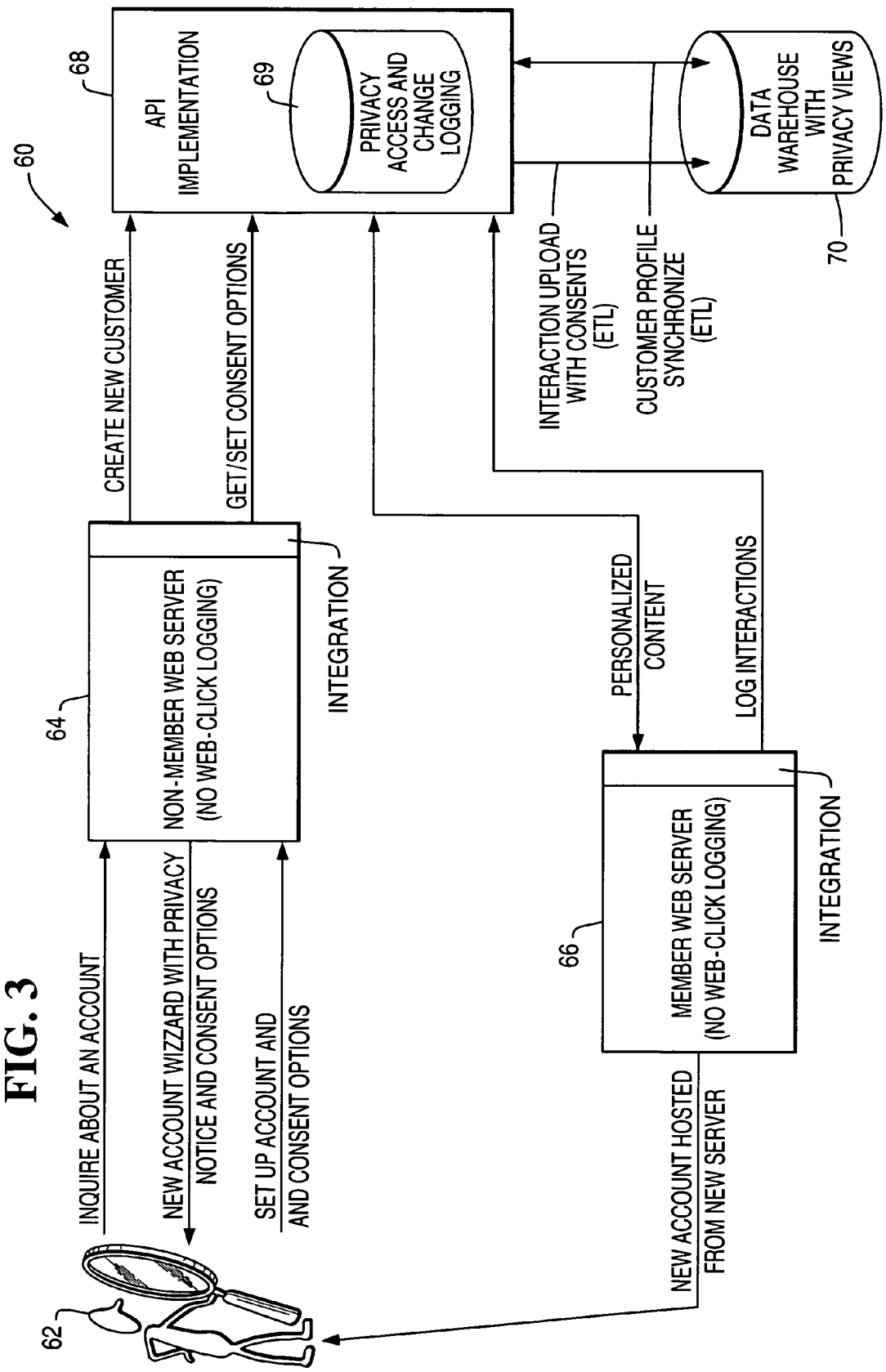
FIG. 3 depicts a diagram of an implementation that obtains consent prior to data collection in accordance with the principles of the present invention.

For a case where a business must obtain prior consumer consent before any type of data collection can be performed, an implementation similar to that shown in FIG. 3 may be used. In FIG. 3 there is shown a business model generally designated 60 that exemplifies the principles of the present invention and attention is now directed thereto. It should be appreciated that the various components depicted in FIG. 3 are electronically and/or electromagnetically networked. A non-member web server 64 is used to establish contact with a customer 62 via a computer, PDA, web enabled device or the like, or await for contact to be established by the customer 62 via a like device.

In either case, the customer may inquire about an internet account or the like. The customer 62 will contact the non-member web server 64 via a channel application such as a web browser. The non-member web server 64 is in communication with a CIS/API implementation device (i.e. a computer or other web-enabled device). When the customer 62 desires to sign up for a personalized account, they are presented with a privacy notice from the CIS foundation architecture/API implementation device 68. The privacy notice informs the customer 62 that personal data will be collected along with an interface for opting in or out of various categories of data collection and for specifying consent to information processing by category. These functions are preferably implemented via APIs that are hosted by a CIS foundation architecture/API implementation device 68. The non-member web server 64 does not perform any data collection from a customer 62.

Once the privacy/consent options are specified or set by the customer 62, the customer's account can be hosted from a web server 66 that collects data, such as web clicks. The CIS foundation/API implementation device 68 then must ensure that the proper consent options are synchronized with the privacy enabled warehouse 70. As well, privacy access and change logging 69 is performed by the CIS foundation architecture/API implementation device 68.

The CIS foundation architecture/API implementation device 68 interacts with the non-member web server 64 to entertain the request to create a new customer and to obtain/set consent options that are presented to the customer 62. The CIS foundation architecture/API implementation 68 interacts with the non-member web server 64 via an integration program associated with the non-member web server 64. During this exchange of information/data between the CIS foundation architecture/API implementation device 68 and both the non-member web server 64 and the member web server 66, customer profile synchronization via ETL is occurring between the CIS foundation architecture/API implementation device 68 and the data warehouse 70 as well as an interaction upload with consents via ETL from the CIS foundation architecture/API implementation device 68 to the data warehouse 70.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In an electronic network, an architecture for providing privacy of consumer data during a business transaction comprising:
a host computer in communication with the network;
a plurality of APIs resident on said host computer, wherein one of said APIs interfaces with a channel application operating on a presentation device that is in communication with the network to request access to various consumer privacy data during the business transaction, another one of said APIs interfaces with the channel application operating on the presentation device to request consumer consent to various privacy data categories during the business transaction, and a further one of said APIs interfaces with an operational application operating on the network to obtain the consumer privacy data consistent with the access to the various consumer privacy data and the consent to various privacy data categories during the business transaction;
a consumer privacy access and consent log in communication with the network and for retaining consumer consents to various privacy data categories; and
a data warehouse in communication with the network and for retaining consumer privacy data obtained during the business transaction and previously obtained consumer privacy data, said data warehouse interfacing with an analytical application operating on the network so that the analytical application may view consumer privacy categories retained by said data warehouse.

2. The architecture of claim 1, further comprising:
a second consumer privacy access and consent log in communication with said data warehouse and for retaining access and consents to various privacy data categories from said data warehouse.

3. An architecture for obtaining consumer privacy data via a network comprising:
a host device in communication with the network and containing a first API and a second API, wherein said first API which interfaces with a channel application functioning on a presentation device in communication with the network to request privacy data parameters from a consumer, and said second API which interfaces with the channel application operating on the presentation device to request consumer consent to various privacy data categories; and a third API which interfaces with an operational application functioning on the network to retrieve privacy data relating to the consumer according to said privacy data parameters and the consent to various privacy data categories;

a privacy access and change log in communication with said host device and for retaining said consumer privacy data parameters; and a data warehouse in communication with the network and operable to: retain consumer privacy data; and provide view-level access to an analytical application, wherein the analytical application interfaces with said data warehouse to analyze the data of a plurality of consumers via said view level access provided by said data warehouse.

4. The architecture of claim 3, wherein said analytical application is operable to analyze the data of a plurality of consumers to thereby obtain at least one of propensity information and market segmentation information.

5. The architecture of claim 3, wherein said analytical application is operable to choose a view of the data of a plurality of consumers such that the view matches a type of analysis that said analytical application will perform on the data of a plurality of consumers.

6. The architecture of claim 3, wherein said data warehouse is operable to determine that consumer privacy data retained by said data warehouse should be one of erased and anonymized so that an extract, transform and load adapter may synchronize consumer privacy data changes with a data store.

7. A system for obtaining consumer privacy data from a consumer in accordance with consumer-defined consumer privacy data parameters via a network comprising:

a first API for communicating with a channel application to request a privacy data parameter from a consumer, a second API for communicating with a channel application for receiving consumer privacy data from the consumer in accordance with said privacy data parameters communicated through said first API;

a third API interfacing with an operational application functioning on the network to retrieve privacy data relating to the consumer according to said privacy data parameters;

a data warehouse for storing said consumer privacy data; and a privacy access and change log for storing said consumer privacy data parameters so that access to said stored consumer privacy data is performed in accordance with said privacy data parameters; and an analytical application coupled to the data warehouse through an interface so that the data warehouse provides the analytical application view-level access to consumer privacy data categories in accordance with the consumer privacy data parameters.

8. The system of claim 7, said analytical application analyzes the data of a plurality of consumers via said view-level access provided by said data warehouse.

9. The system of claim 8, wherein said analytical application analyzes the data of a plurality of consumers to generate one of propensity information and market segmentation information.

10. The system of claim 8, wherein said analytical application identifies a view of the data of a plurality of consumers that matches a type of analysis that said analytical application will perform on the data of a plurality of consumers.

* * * * *